United States Patent
Ou (10) Patent No.: US 10,064,508 B2
(45) Date of Patent: Sep. 4, 2018

(54) CONTAINER WITH FIXED GLASS BALL INCLUDING COOLING MATERIAL

(71) Applicant: Pacific Vial Mfg., Inc., Commerce, CA (US)

(72) Inventor: Suk Hwan Ou, Commerce, CA (US)

(73) Assignee: PACIFIC VIAL MFG., INC., Commerce, CA (US)

( * ) Notice: Subject to any disclaimer, the term of this patent is extended or adjusted under 35 U.S.C. 154(b) by 0 days.

(21) Appl. No.: 15/421,362

(22) Filed: Jan. 31, 2017

(65) Prior Publication Data

US 2018/0213956 A1    Aug. 2, 2018

(51) Int. Cl.
| | |
|---|---|
| *F25D 3/08* | (2006.01) |
| *A47G 19/22* | (2006.01) |
| *C03B 23/07* | (2006.01) |
| *C03B 23/13* | (2006.01) |
| *C03B 23/049* | (2006.01) |
| *B65D 81/18* | (2006.01) |
| *F25D 31/00* | (2006.01) |
| *B65D 6/00* | (2006.01) |

(52) U.S. Cl.
CPC ......... *A47G 19/2288* (2013.01); *B65D 81/18* (2013.01); *C03B 23/049* (2013.01); *C03B 23/07* (2013.01); *C03B 23/13* (2013.01); *F25D 31/003* (2013.01); *F25D 31/008* (2013.01); *B65D 7/12* (2013.01); *F25D 2331/808* (2013.01); *F25D 2331/809* (2013.01)

(58) Field of Classification Search
CPC ............... F25D 31/003; F25D 31/008; F25D 2331/808; F25D 2331/809; A47G 19/2228; B65D 81/18; B65D 81/22; B65D 7/12

USPC ................ 156/45; 220/678, 677
See application file for complete search history.

(56) References Cited

U.S. PATENT DOCUMENTS

| | | | | |
|---|---|---|---|---|
| 2,187,558 | A * | 1/1940 | Kushima | F25D 3/08 62/457.3 |
| 5,148,688 | A * | 9/1992 | Pimm | F25D 3/08 62/457.3 |
| 8,277,543 | B2 * | 10/2012 | Zauderer | B01D 53/1475 165/104.11 |
| 2015/0089964 | A1 * | 4/2015 | Chung | F25D 3/00 62/457.3 |

FOREIGN PATENT DOCUMENTS

GB          2383122 A * 6/2003 ......... A47G 19/2288

OTHER PUBLICATIONS

How Stuff Works, "How to repair China, Porcelain, and Glass", Sep. 12, 2016, http://home.howstuffworks.com, retrieved on Oct. 23, 2017.*

* cited by examiner

*Primary Examiner* — Orlando E Aviles Bosques
(74) *Attorney, Agent, or Firm* — Womble Bond Dickinson (US) LLP (57) ABSTRACT

A container and a method of manufacturing a container having a base portion and a sidewall which together form a partially enclosed space for holding a fluid; and a cooling element fixedly connected to the base portion, the cooling element comprising a cavity and a cooling material sealed within the cavity.

7 Claims, 5 Drawing Sheets

CONTAINER WITH FIXED GLASS BALL INCLUDING COOLING MATERIAL

FIELD

An embodiment is related to a container and a method of manufacturing a container which includes a fixed hollow ball and a cooling material within the ball. More specifically, a container with a fixed glass ball and glycerin loaded within the glass ball to provide cooling. Other embodiments are also described.

BACKGROUND

Various containers currently exist for holding and consuming beverages. Most containers, however, are unable to adequately cool the beverage therein without the use of, for example, ice cubes. Ice cubes, however, while providing a cooling effect, eventually melt within the beverage and cause the beverage to be diluted.

SUMMARY

The instant invention is directed to a container with a cooling element fixed therein for cooling of a fluid, such as a liquid, held within the container. The container may, for example, be a glass container and the cooling element may be a hollow glass ball integrally formed with the container and having a cooling material within the hollow area of the ball. The cooling material may, for example, be glycerin, or any other cooling material that can be loaded within the ball. In one embodiment, a method of manufacturing the container having a cooling element may include using glass processing techniques (e.g., glass blowing techniques) to form the glass container and the glass ball having a hollow center. The container and the glass ball may each be formed with an opening in one side. The glass ball may be fire sealed with the glass container so that the openings align. The container with glass ball may be annealed and then a cooling material may be inserted into the glass ball through the ball opening and the opening in the bottom of the container. A seal is then applied over the opening so that the cooling material remains sealed within the glass ball. The container with cooling material sealed within the glass ball can then be stored in, for example, a freezer for a period of time sufficient to cool the cooling material to a desired temperature. Once the cooling material is cooled, a beverage may be placed within the container and cooled by the glass ball having the cooling material therein without diluting, or otherwise negatively impacting, a flavor of the beverage.

More specifically, in one embodiment, a container having a fixed cooling element is provided. The container may include a base portion and a sidewall that together form a partially enclosed space for holding a fluid. A cooling element may be fixedly connected to the base portion and include a hollow interior area or cavity and a cooling material sealed within the cavity. The cooling element may be positioned within the partially enclosed space of the container. The container and the cooling element may be made of glass. The cooling element may include a glass ball and the cavity is formed within the glass ball. In addition, the cooling material may include a substance operable to cool a surrounding fluid held within the partially enclosed space. In some embodiments, the cooling material may be glycerol, also known as glycerin. It should understood that glycerin can be cooled to relatively low temperatures without freezing and expanding, and is therefore suitable for use within the hollow interior area of the glass ball, but other materials having similar properties are also contemplated. In some case, the hollow interior area or cavity of the cooling element may have a volume of from about 40 ml to about 55 ml. The cooling material within the cavity may have a volume of about 10 ml to about 20 ml.

In another embodiment, a method of manufacturing a container with a cooling element fixed therein is provided. The method may include the processing operations of forming a glass container having a base portion and a sidewall which together form a partially enclosed space for holding a fluid, forming a glass cooling element including a cavity and a cooling material sealed within the cavity and thermally attaching the glass cooling element to the base portion of the glass container. Forming the glass container may include forming a glass tube into the shape of the container and forming an opening in the base portion of the container. In addition, the glass cooling element may include using a glassblowing technique to form a glass tube into the shape of a ball having a hollow cavity therein and forming an opening through a sidewall of the ball to the hollow cavity. Still further, forming the glass cooling element may include aligning an opening to the cavity within the glass cooling element with an opening through the base portion of the glass container and introducing the cooling material into the cavity by injecting the cooling material through the opening in the base portion and the opening to the cavity. In addition, the process may include applying a sealing material over the opening through the base portion of the container to seal the cooling material within the cavity. Still further, the glass container having the cooling element therein may be annealed prior to introducing the cooling material into the cavity.

In still further embodiments, a method of manufacturing a glass container with a cooling element fixed therein is provided. The method may include the processing operations of providing a first glass tube, a second glass tube and a third glass tube, at least one of the first glass tube, the second glass tube or the third glass tube secured within a chuck; applying heat to the first glass tube to form the first glass tube into a base portion of a glass container, the base portion having an opening therein; applying heat to the second glass tube to form the second glass tube into a glass ball, the glass ball having a hollow interior area and an opening to the hollow interior area; attaching the glass ball to a surface of the base portion such that the opening of the glass ball is aligned with the opening of the base portion; applying heat to the third glass tube to attach the third glass tube to the base portion and form a glass container having a sidewall extending from the base portion, wherein the sidewall defines a partially enclosed space for holding a fluid around the glass ball; introducing a cooling material into the hollow interior area of the glass ball through the openings in the glass ball and the base portion; and sealing the opening in the base portion to seal the cooling material within the hollow interior area of the glass ball. In some embodiments, the first glass tube and the third glass tube comprise a diameter of from about 65 mm to about 75 mm and the second glass tube comprises a diameter of from about 40 mm to 50 mm. In some embodiments, attaching the glass ball to the surface of the base portion may include positioning the glass ball against the surface of the base portion and applying heat to thermally seal the glass ball to the surface of the base portion. In some cases, prior to introducing a cooling material, the glass container having the glass ball attached thereto is annealed for 45 minutes to 75 minutes at a temperature of 1000 to 1100 degrees Fahrenheit. In some embodiments, at least one of the first glass tube, the second glass tube or the third glass tube comprises 33 expansion borosilicate. In some cases, sealing may include applying epoxy over the opening in the base portion of the container.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description. In addition, the terms "over", "to", and "on" as used herein may refer to a relative position of one feature with respect to other features. One feature "over" or "on" another feature or bonded "to" another feature may be directly in contact with the other feature or may have one or more intervening layers. In addition, the use of relative terms throughout the description, such as "top", "above or "upper" and "bottom", "under" or "lower" may denote a relative position or direction. For example, a "top edge", "top end" or "top side" may be directed in a first axial direction and a "bottom edge", "bottom end" or "bottom side" may be directed in a second direction opposite to the first axial direction.

Figure 1:
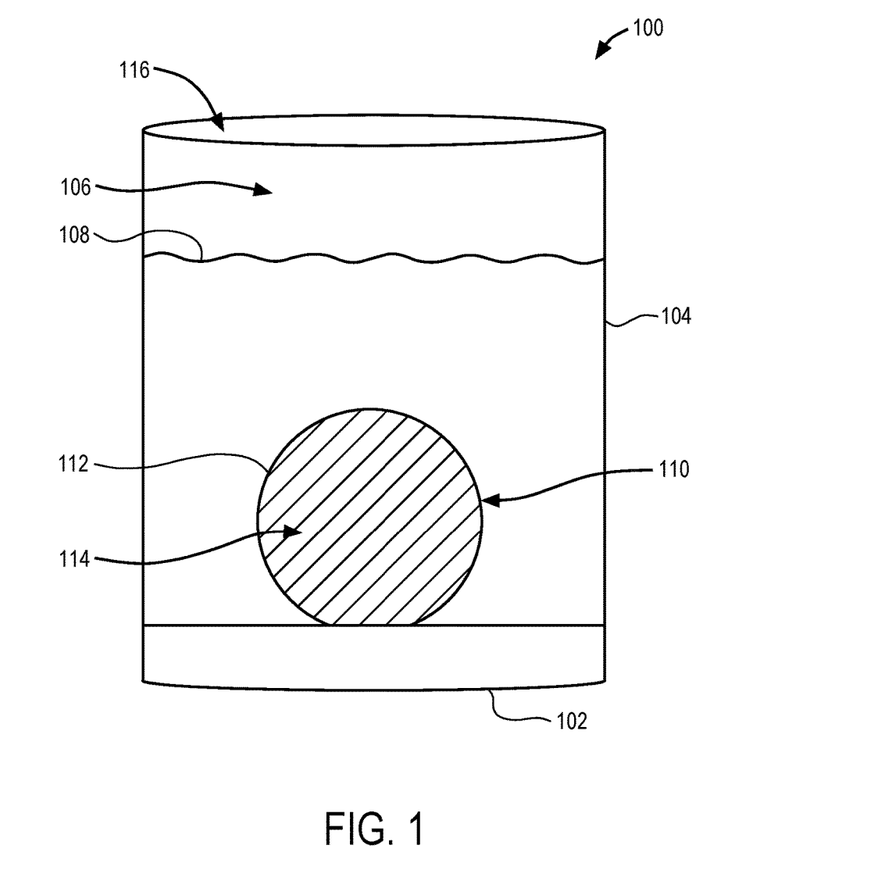
FIG. 1 illustrates a side view of one embodiment of a container having a fixed cooling element.

FIG. 1 illustrates a side view of one embodiment of a container having a fixed cooling element. In one embodiment, container 100 may have a base portion 102 and a sidewall 104, which together form a partially enclosed space 106 for holding a substance 108 therein. The end of sidewall 104 opposite base portion 102 may form opening 116 to the partially enclosed space 106 within container 100 to allow for substance 108 to be introduced therein. Container 100 may further include cooling element 110, which is used to cool substance 108 contained within container 100. In this aspect, cooling element 110 may be positioned within partially enclosed space 106 and along base portion 102. Cooling element 110 may be fixedly attached (e.g., thermally attached) to base portion 102 such that it does not move or slide around within partially enclosed space 106. In one embodiment, cooling element 110 may include a hollow member, such as hollow ball 112, which defines a hollow interior area such as a cavity, and a cooling material 114 positioned within the cavity. The cooling material 114 may be any type of cooling material that can be loaded within hollow ball 112 and that is capable of cooling a surrounding substance. For example, cooling material 114 may be any type of material that can be stored within a freezer for a period of time and cooled to a reduced temperature, and once cooled, is operable to cool, or otherwise reduce a temperature of, surrounding substance 108 without the need for ice cubes or other substances typically used to cool beverages. For example, in one embodiment, cooling material 114 may be a fluid substance including glycerol, also referred to as glycerin, sealed within hollow ball 112. Since cooling material 114 is sealed within hollow ball 112, it provides the further advantage of not diluting the surrounding substance 108, as commonly happens when ice cubes are used.

Container 100 may have an overall size and shape suitable for receiving and containing substance 108, for example, a beverage, therein. For example, in one embodiment, container 100 may be a flat bottomed container typically referred to as a lowball or Old Fashioned glass used to serve whiskey or another alcoholic beverage. In this aspect, container 100 may be of a size and shape suitable for containing from about 6 fluid ounces to about 16 fluid ounces of a substance, or from about 6 fluid ounces to about 10 fluid ounces. Containers of other sizes and shapes are, however, also contemplated. Hollow ball 112 may have any size and shape suitable for being retained within open space 106 and cooling the surrounding substance 108, while still allowing for a desired amount of substance 108 to be contained within container 100 (for example, at least 6 fluid ounces of substance 108). In addition, it should be understood that while hollow ball 112 is shown as a spherical structure, it may have any shape suitable for forming a cavity within which the cooling material 114 can be loaded, for example, a cylinder, square, rectangle, cone, triangle or the like.

Container 100 and hollow ball 112 may be made of glass and integrally formed with one another using various glass processing techniques. One exemplary process for manufacturing container 100, hollow ball 112, and their associated components, will now be discussed in reference to FIG. 2 to FIG. 13.

Figure 2:
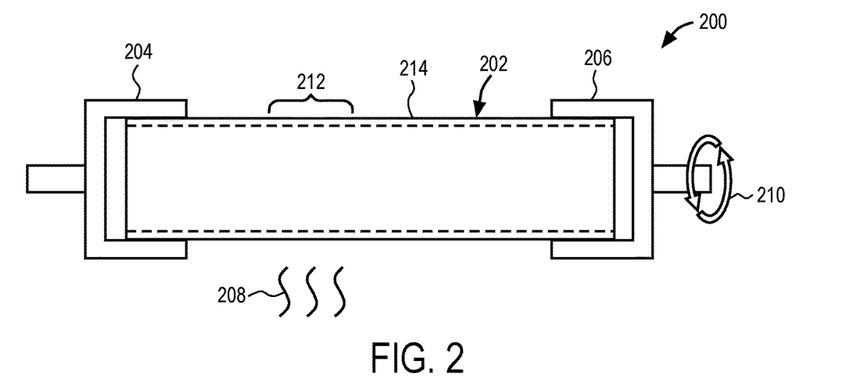
FIG. 2 illustrates one embodiment of a processing operation for forming a container having a fixed cooling element including applying heat to a first tube.

FIG. 2 illustrates one embodiment of a processing operation 200 for forming container 100. Representatively, processing operation 200 includes securing a glass tube 202 at each end between a left chuck 204 and a right chuck 206. Glass tube 202 may be a substantially hollow tube such that the wall 214 of glass tube 202 defines a substantially hollow area therein. Once glass tube 202 is secured, glass tube 202 is rotated, as illustrated by arrows 210, by left and right chucks 204, 206. Representatively, left and right chucks 204, 206 may be part of a machine that can be used to rotate glass tube 202 at a rate of from about 30 revolutions per minute (RPM) to about 60 RPM. Heat 208 is further applied to glass tube 202 to heat a desired section 212 of glass tube 202. In one embodiment, heat 208 may be applied by, for example, a burner that is also part of the machine, and aligned with section 212 of glass tube 202. In one embodiment, glass tube 202 may be used to form base portion 102 of container 100 as shown in FIG. 1. In this aspect, glass tube 202 may be a glass tube having a diameter of from about 65 millimeters to about 75 millimeters. Glass tube 202 may, for example, be a 33 expansion borosilicate glass tube. It should be noted, however, that although specific processing parameters (e.g. rotation speed, diameter, etc.) may be disclosed herein, the parameters can vary depending upon, for example, the machine speed.

Figure 3:
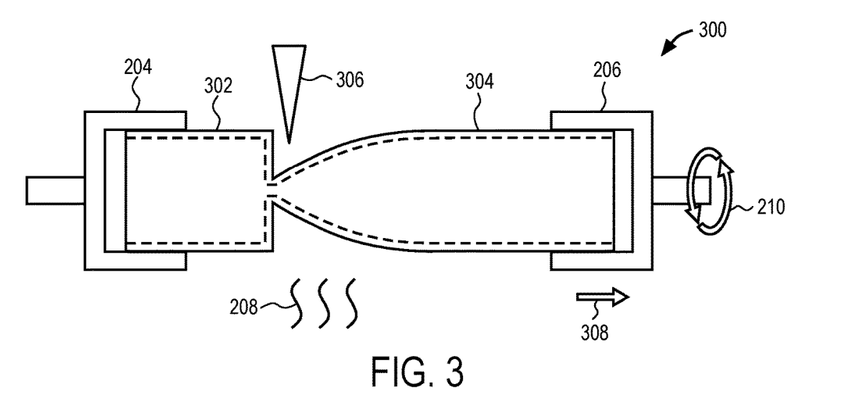
FIG. 3 illustrates the glass tube of FIG. 2 after the further processing operation of applying pressure to a heated section of the heated first tube to collapse the heated section.

FIG. 3 illustrates the glass tube of FIG. 2 after the further processing operation 300 of applying pressure to heated section 212 of the heated glass tube 202 to collapse the heated section 212. For example, pressure may be applied using a tool 306. Tool 306 may be any type of relatively pointed tool suitable for applying a pointed pressure to wall 214 of glass tube 202 (as shown in FIG. 2). Tool 306 may be part of the machine used to heat and/or rotate glass tube 202. Representatively, tool 306 may be a graphite or steel tool having a pointed end that is pressed by a machine against wall 214 while glass tube 202 is rotating. Applying an inward pressure to wall 214 within section 212 causes wall 214 to collapse into the hollow interior area of glass tube 202 and form end sections 302, 304 as shown in FIG. 3. The inward pressure may depend on how soft the glass is after the heating process but, in some cases may be, for example, from about 2-4 pounds per square inch. The amount of time the pressure is applied may depend on, for example, the machine speed. The wall 214 should be collapsed a sufficient distance to separate glass tube 202 into different end sections 302, 304, while still leaving an opening to the interior area of section 302, as shown. In other words, the opposing sides of wall 214 are not completely collapsed against one another. Once wall 214 is collapsed to a sufficient degree, end section 302 and end section 304 are completely separated from one another, for example by pulling end section 304 in a direction of arrow 308.

Figure 4:
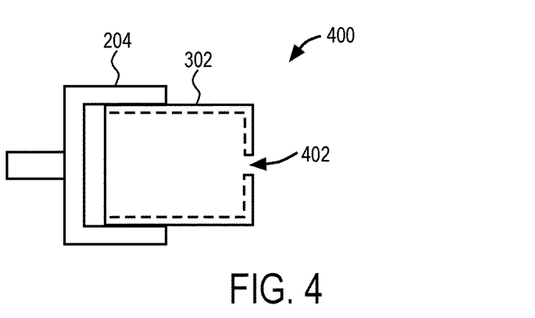
FIG. 4 illustrates the glass tube of FIG. 3 after the further processing operation of removing an end of the heated first tube to form a base portion for a container.

FIG. 4 illustrates glass tube end section 302 of FIG. 3 after the further processing operation 400 of removing end section 304. It can further be seen from this view that the remaining tube end section 302 includes opening 402. As will be discussed in more detail in reference to FIGS. 7-13, end section 302 will form the base portion of container 100, and opening 402 will form part of a channel used to load a cooling material into the cooling element within container 100.

Figure 5:
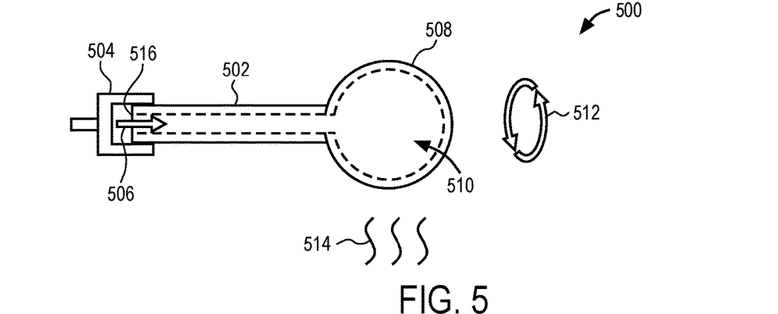
FIG. 5 illustrates the further processing operation of applying heat to a second tube to form a hollow ball.

FIG. 5 illustrates the further processing operation 500 of applying heat and using glass blowing techniques on a second glass tube to form a hollow glass ball. More specifically, processing operation 500 shows a second glass tube 502, which is a different tube than the first glass tube 202, secured within chuck 504. It should further be noted that chuck 504 may be the same chuck as left chuck 204 previously discussed in reference to FIG. 2 to FIG. 4, or a different chuck. For example, second glass tube 502 is used to form hollow glass ball 508 and may therefore have a narrower diameter than first glass tube 202. Representatively, second glass tube 502 may have a diameter of from about 40 mm to about 50 mm, for example, about 42 mm to about 48 mm, or from about 44 mm to about 45 mm. Chuck 504 may rotate second glass tube 502 as illustrated by arrows 512, and in some cases, heat may be applied to the end of second glass tube 502 to soften and close off the end of the tube as shown. Alternatively, second glass tube 502 may have one open end and one closed end, similar to that of a vial, such that an end does not need to be closed off. To form hollow glass ball 508 from second glass tube 502, heat 514 is applied to the end of second glass tube 502 and air may be blown into open end 516 of second glass tube 502 in a direction of arrow 506. Air may be blown into the open end 516 using, for example a machine operable to output a flow of air, for example, an air compressor. The air pressure produced by the air compressor may be regulated to blow at a desired pressure (e.g., 20-30 psi) depending on machine speed, flame temperature and desired ball size. Since the opposite end of second glass tube 502 is closed, the air pressure causes the closed end of glass tube to expand and form glass ball 508 having a hollow interior area 510 as shown. The air pressure may be applied until glass ball 508 has the desired size and shape.

Figure 6:
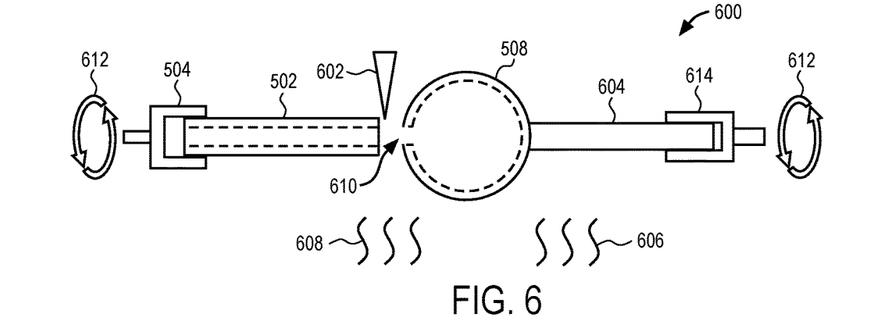
FIG. 6 illustrates the hollow ball of FIG. 5 after the further processing operation of attaching the hollow ball to a support member and separating the hollow ball from the second tube.

FIG. 6 illustrates hollow glass ball 508 of FIG. 5 after the further processing operation 600 of attaching (e.g., thermally attaching) hollow glass ball 508 to a support member and separating the glass ball from the second glass tube 502. Representatively, a support member 604 attached to, for example, a chuck 614 (which may be the same as chuck 206), is pressed against one side of glass ball 508 and fire sealed to glass ball 508, such as by applying heat 606. Once support member 604 is secured to glass ball 508, heat 608 is applied to the other side of glass ball 508 and tool 602 is used to apply pressure to the portion of second glass tube 502 that is adjacent to glass ball 508. The pressure applied is sufficient to separate second glass tube 502 from glass ball 508, leaving behind glass ball 508 having opening 610 where second glass tube 502 used to be attached. Both second glass tube 502 (with glass ball 508 formed thereto) and support member 604 may further be rotated during operation 600 as shown by arrows 612 to facilitate even heating and separation of glass ball 508 from second glass tube 502.

Figure 7:
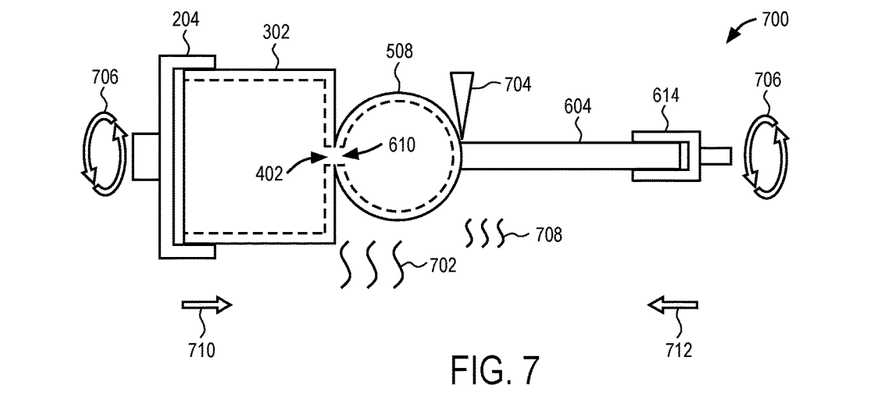
FIG. 7 illustrates the hollow ball of FIG. 6 after the further processing operation of attaching the hollow ball to the base portion of FIG. 4 and separating the hollow ball from the support member.

FIG. 7 illustrates hollow glass ball 508 of FIG. 6 after the further processing operation 700 of attaching (e.g., thermally attaching) the hollow glass ball 508 to the end section 302 described in reference to FIG. 4 and separating the hollow glass ball 508 from the support member 604. In particular, hollow glass ball 508 is positioned against end section 302 by advancing either one, or both, of chuck 204 and chuck 614 toward the other (as shown by arrows 710, 712). Hollow glass ball 508 and end section 302 are aligned such that their respective openings 610 and 402 are axially aligned with one another. Once aligned, heat 702 is applied so that end section 302 and hollow glass ball 508 are heat sealed to one another. Once hollow glass ball 508 is attached to end section 302, support member 604 is separated from hollow glass ball 508 by applying heat 708 to the other side of hollow glass ball 508 attached to support member 604 and applying pressure to this region using a tool 704. Both end section 302 and support member 604 may further be rotated as shown by arrows 706 to facilitate even heating and separation of glass ball 508 from support member 604.

Figure 8:
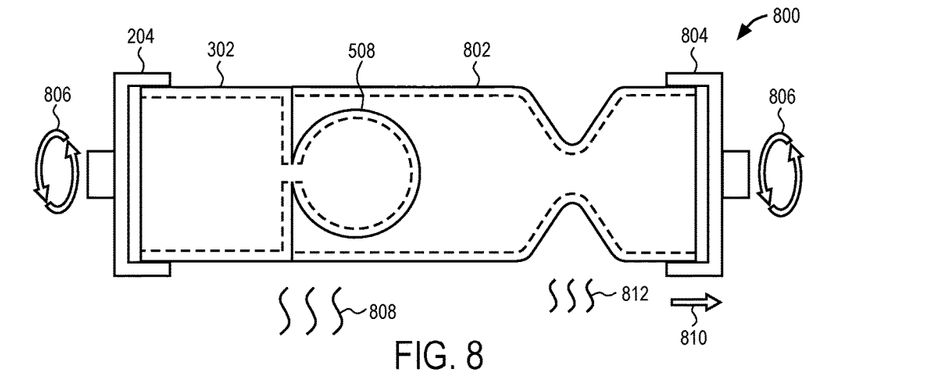
FIG. 8 illustrates the hollow glass ball and base portion of FIG. 7 after the further processing operation of positioning a third tube around the hollow ball and attaching the third tube to the base portion.

FIG. 8 illustrates the hollow glass ball 508 and end section 302 of FIG. 7 after the further processing operation 800 of positioning a third glass tube 802 around the hollow glass ball 508 and attaching the third glass tube 802 to the end section 302. Representatively, third glass tube 802 may be secured within chuck 804 and advanced in a direction toward end section 302 so that the end of third glass tube 802 contacts the surface of end section 302. Third glass tube 802 may have a similar diameter to that of the first glass tube used to form end section 302 (e.g., about 65 mm to about 75 mm). Heat 808 may then be applied so that the end of third glass tube 802 is heat sealed to end section 302. Once attached, heat 812 may be applied to the other end of third glass tube 802 and chuck 804 may be advanced in a direction away from chuck 204, as shown by arrow 810, so that a portion of third glass tube 802 held within chuck 804 is removed or otherwise cut off as shown in processing operation 900 of FIG. 9. It should be understood that the remaining portion of third glass tube 802 will form the sidewall 104 of container 100 shown in FIG. 1, so the portion of the third glass tube cut off will vary depending upon the desired height of the container. In addition, although not shown, a graphite reamer may further be used to straighten the wall of the remaining third glass tube portion 902. Both end section 302 and third glass tube 802 may be rotated throughout processing operation 800 as shown by arrows 706 to facilitate attachment of third glass tube 802 to end section 302 and separation of the remaining portion of third glass tube 802.

Figure 9:
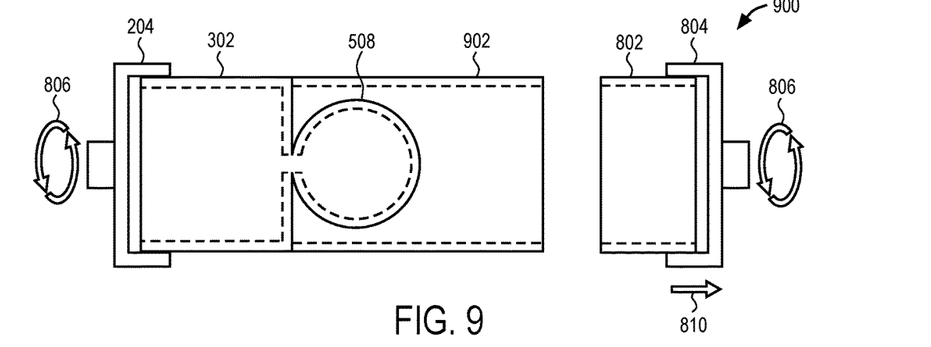
FIG. 9 illustrates the processing operation of FIG. 8 after the further processing operation of removing an end of the third tube to form the container having the base portion and the hollow ball therein.
Figure 10:
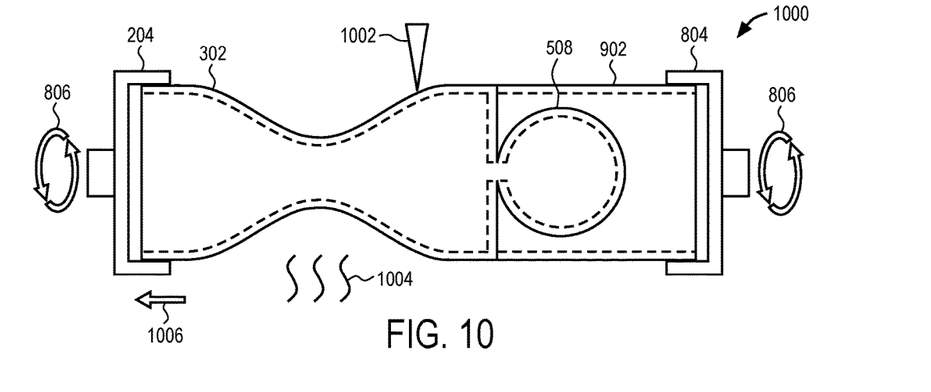
FIG. 10 illustrates the container of FIG. 9 after the further processing operation of removing a portion of the base portion.

FIG. 10 illustrates the container of FIG. 9 after the further processing operation 1000 of removing a portion of the end section 302 to shorten the end section. More specifically, third glass tube portion 902 is secured within chuck 804 (once the other portion of the third glass tube is removed) such that both ends of the container are held within a chuck, and optionally rotated as shown by arrows 806. Heat 1004 is then applied to an end of end section 302 as shown, and chuck 204 holding end section 302 is advanced in a direction away from chuck 804 (see arrow 1006). A tool 1002 (e.g., a graphite paddle), is then placed along the wall of end section 302 and a pressure is applied until a portion of end section 302 is removed as shown.

Figure 11:
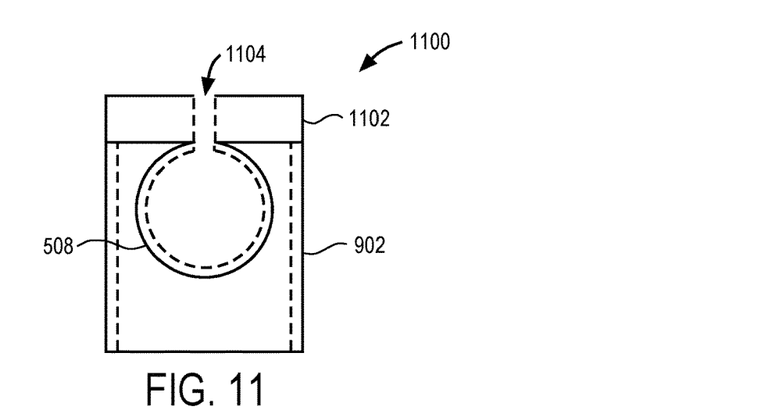
FIG. 11 illustrates the container of FIG. 10 with an opening formed through the base portion and the hollow ball, which can be used for introduction of a cooling material.
Figure 12:
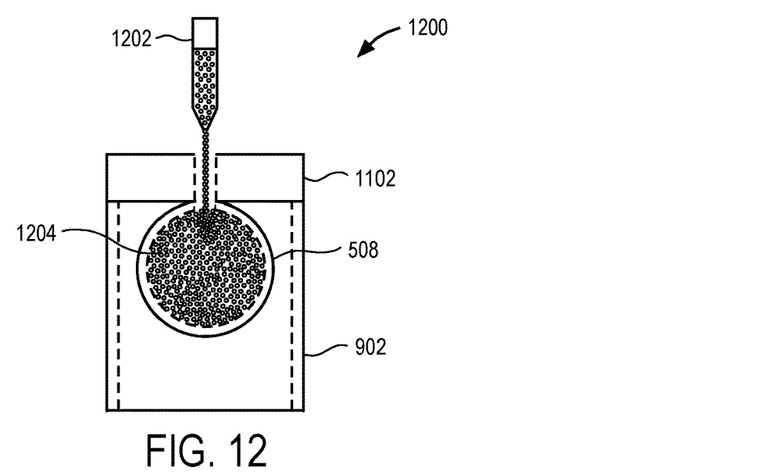
FIG. 12 illustrates the container of FIG. 11 after the further processing operation of introducing a cooling material into the hollow ball.
Figure 13:
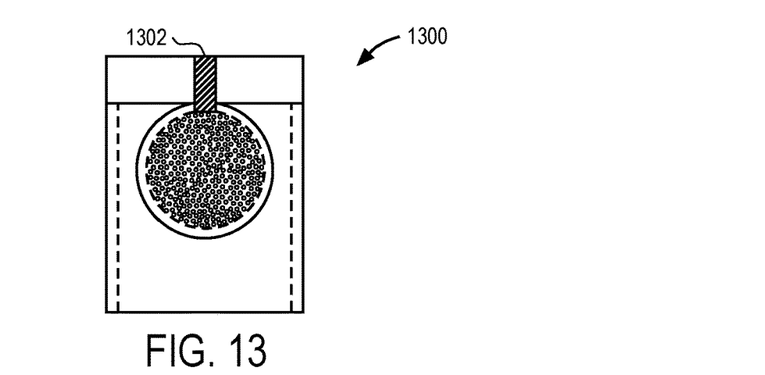
FIG. 13 illustrates the container of FIG. 12 after the further processing operation of sealing the opening of the base portion to seal the cooling material within the hollow ball.

FIG. 11 illustrates the resulting container 1100 (e.g., container 100 of FIG. 1) made up of the remaining end section 1102 (e.g., base portion 102 of FIG. 1), remaining third glass tube portion 902 (e.g., sidewall 104 of FIG. 1) and hollow glass ball 508 (e.g., glass ball 112 of FIG. 1) positioned therein. This resulting container is, in some embodiments, placed in an oven and annealed for approximately 45 minutes to 75 minutes, or more specifically 1 hour, at a temperature of approximately 1000 to 1100 degrees Fahrenheit, or more specifically 1050 Fahrenheit. It can further be seen from FIG. 11 that the previously discussed openings of glass ball 508 and end section 1102 are aligned to form a single opening or channel 1104 to the hollow interior area of glass ball 508. This opening or channel 1104 is then used to fill glass ball 508 with a cooling material 1204 as shown in processing operation 1200 of FIG. 12. Representatively, cooling material (e.g., glycerin, a glycerin solution or the like) may be loaded into a dispenser 1202 and then injected, or otherwise introduced, through channel 1104 into the hollow interior are of glass ball 508 as shown in FIG. 12. Once the hollow interior area of glass ball 508 is filled to a desired level with cooling material 1204, channel 1104 is sealed with a sealing material 1302, for example with clear epoxy, as shown in processing operation 1300 of FIG. 13. In some embodiments, the total volume of the glass ball with glycerin is around 67 milliliters. In still further embodiments, the volume of the glass ball itself may be from about 40 ml to about 55 ml, or about 51 ml. In addition, a volume of the cooling material may be from about 10 ml to about 20 ml such that it does not occupy the entire volume of the glass ball.

While certain embodiments have been described and shown in the accompanying drawings, it is to be understood that such embodiments are merely illustrative of and not restrictive on the broad invention. For example, although a glass container is described herein, it is contemplated that the container may be made of any material suitable for holding and cooling a beverage therein. Representatively, the container may be a made of another material such as a ceramic or insulated metal material. Moreover, although glycerin is specifically mentioned as the cooling material, any material suitable for cooling a liquid held within the container may be used. Representatively, the cooling material may be any type of liquid, gel or solid material that can be inserted within the cavity of the container and produce a cooling effect. For example, the material may be a combination of glycerin and water, hydroxethyl cellulose, sodium polyacrylate or vinyl-coated silica gel, a material that undergoes an exothermic reaction such as a mixture of ammonium nitrate, calcium ammonium nitrate or urea and water, or a solid material such as a metal. In addition, it should be understood that each of the processing operations disclosed herein may be performed by a single machine or a combination of machines, such that each of the steps are considered automated and capable of being performed without user intervention. Thus, the invention is not limited to the specific constructions and arrangements shown and described herein and various other modifications may occur to those of ordinary skill in the art.

What is claimed is:
1. An apparatus comprising:
   a container having a base portion and a sidewall which together form a partially enclosed space for holding a fluid; and
   a cooling element integrally formed with the interior most surface of the base portion forming the partially enclosed space, the cooling element comprising a cavity and a cooling material sealed within the cavity, wherein the cooling material is sealed within the cavity by a sealing material fixedly positioned within a channel, the channel extends through the entire base portion in a height direction of the base portion and a portion of the cooling element, the sealing material originates within the cavity and extends through the entire channel, culminating at an outermost surface of the base portion, the outermost surface being perpendicular to the height direction.

2. The apparatus of claim 1 wherein the container and the cooling element are a single integrally formed unit made of glass.

3. The apparatus of claim 1 wherein the cooling element comprises a glass ball and the cavity is formed within the glass ball, and wherein the channel extends into the cavity, and wherein the sealing material is.

4. The apparatus of claim 1 wherein the cooling material comprises a substance operable to cool a surrounding fluid held within the partially enclosed space.

5. The apparatus of claim 1 wherein the cooling material comprises glycerin.

6. The apparatus of claim 1 wherein the cavity of the cooling element comprises a volume of from 40 ml to 55 ml.

7. The apparatus of claim 6 wherein the cooling material within the cavity comprises a volume of 10 ml to 20 ml.

* * * * *